United States Patent [19]
Kruse et al.

[11] Patent Number: 5,623,246
[45] Date of Patent: Apr. 22, 1997

[54] VEHICLE IMPACT SENSOR ARRANGEMENT FOR DETECTING A SIDE IMPACT

[75] Inventors: Dion Kruse, Alingsas; Yngve Haland, Falsterbo, both of Sweden

[73] Assignee: Autoliv Development AB, Vargarda, Sweden

[21] Appl. No.: 409,824

[22] Filed: Mar. 24, 1995

Related U.S. Application Data

[63] Continuation-in-part of Ser. No. 45,533, Apr. 12, 1993, abandoned.

[30] Foreign Application Priority Data

Apr. 16, 1992 [GB] United Kingdom ............. 9208458

[51] Int. Cl.⁶ .................................................. B60R 21/22
[52] U.S. Cl. .................... 340/438; 340/436; 280/734; 280/735; 180/274
[58] Field of Search ......................... 340/436, 425.5, 340/438; 280/734, 731, 730 A, 730 R, 735, 728.1, 806; 180/274

[56] References Cited

U.S. PATENT DOCUMENTS

| | | |
|---|---|---|
| 4,966,388 | 10/1990 | Warner et al. . |
| 5,072,966 | 12/1991 | Nishitake et al. ............ 280/730 |
| 5,080,394 | 1/1992 | Mori et al. ................... 280/734 |
| 5,112,079 | 5/1992 | Haland et al. . |
| 5,145,208 | 9/1992 | Hoagland et al. ............ 280/734 |
| 5,273,309 | 12/1993 | Lau et al. .................. 280/730.1 |
| 5,348,342 | 9/1994 | Haland et al. ............. 280/730.1 |

FOREIGN PATENT DOCUMENTS

| | | |
|---|---|---|
| 3-258636 | 11/1991 | Japan . |
| 4-166451 | 6/1992 | Japan . |
| 9006247 | 6/1990 | WIPO . |

*Primary Examiner*—John K. Peng
*Assistant Examiner*—Nathan Joseph Flynn
*Attorney, Agent, or Firm*—Spencer & Frank

[57] ABSTRACT

A vehicle impact sensor arrangement is provided for sensing a side impact. The arrangement comprises at least one sensor which is directly or indirectly fixed to the monocoque shell of a motor vehicle and which is responsive to inward movement of part of a door mounted on a motor vehicle. The part of the door adjacent the sensor is reinforced.

21 Claims, 6 Drawing Sheets

VEHICLE IMPACT SENSOR ARRANGEMENT FOR DETECTING A SIDE IMPACT

CROSS REFERENCE TO RELATED APPLICATIONS

This present application is a continuation-in-part application of application Ser. No. 08/045,533, which was filed Apr. 12, 1993, now abandoned, the subject matter of which is incorporated by reference herein.

BACKGROUND OF THE INVENTION

1. Field of the Invention

THE PRESENT INVENTION relates to a vehicle impact sensor arrangement, and more particularly relates to a vehicle impact sensor arrangement adapted to sense an impact on a side of a vehicle and to activate a safety device within the vehicle such as an air-bag or a seat belt pretensioner.

2. Description of the Related Art

When a vehicle, such as a motor car, is involved in an accident the vehicle can accelerate or decelerate rapidly. In such a situation a person travelling within the vehicle may continue to move at the original speed of the vehicle, due to inertia, and may thus impact with part of the vehicle which has accelerated or decelerated. For example, if a vehicle is subjected to a front impact, the main body of the vehicle may stop relatively rapidly, whilst the person in the vehicle continues to travel forwardly. Thus, in effect, the person travelling in the vehicle is thrown forwardly on to a fixed part of the vehicle, such as the steering wheel or the dash-board. In a side impact situation, however, a person sitting near the site of the impact may be hit by the intruding outer shell of the vehicle before the speed of the main body of the vehicle is changed and very soon after the impact is initiated. These side impact conditions demand special sensor arrangements.

If a safety device is to be activated in response to a side impact, then the sensor which senses the side impact must be able to respond to a side impact in sufficient time to enable the safety device to be deployed before the inside part of the door of the vehicle hits the seat or hits the person sitting on the seat. Because the total distance between the outer skin of the vehicle and the seat is very short, the sensor has to react very rapidly.

It has been proposed previously to mount side impact sensors in the door of a vehicle, even if the safety device is not located in the door. In this case however there is a disadvantage to have to transmit the signal from the sensor on the door to a safety device mounted on the monocoque shell of the vehicle, because the transmission line can be damaged.

U.S. Pat. No. 5,072,966 of Nishitake discloses embodiments of a side impact sensor. The Specification teaches the provision of a shock sensor, in the form of a known acceleration sensitive sensor which is fixed to substantially the central portion in the back-and-forth direction of a vertical wall portion of a side cill of the motor vehicle. Thus the shock sensor is not located on the exterior of the cill, but is located in the interior of the cill. The shock sensors are said to be activated after an elapse of about 5 ms from a side collision in a motor vehicle provided with the described system. The reason for the delay is that the door cill itself must be deformed, before a shock is sensed by the shock sensor.

Since, in a side impact, it is possible for the driver or occupant of a vehicle to be substantially injured approximately 15 milliseconds after commencement of the side impact, a delay of 5 ms before activation of the sensor is not satisfactory.

SUMMARY OF THE INVENTION

According to this invention there is provided a vehicle impact sensor arrangement for sensing a side impact on a vehicle, said motor vehicle having a monocoque shell comprising at least a floor, a door cill and a B-pillar, and a door mounted on the monocoque shell, the sensor arrangement comprising at least one sensor which is directly or indirectly fixed to part of the floor, door cill or B-pillar of the monocoque shell of the motor vehicle and which is responsive to a compressional force exerted on the sensor, the sensor arrangement further comprising a movable element which is separate from the monocoque shell and which is initially located adjacent the sensor, said movable element being arranged and located to move relative to the monocoque shell to contact the sensor and exert a compressive force on the sensor, compressing the sensor between the said movable element and the said part of the monocoque shell to which the sensor is fixed, in response to inward movement of part of the door with respect to the said part of the monocoque shell.

When the vehicle is involved in a side impact, in which the door is struck, part of the door will move inwardly with respect to the monocoque shell of the motor vehicle. This will cause the movable element to be brought into contact with the sensor to exert a compressive force on the sensor. The movable element may form part of the door itself such as, for example, a reinforcing provided at the lower edge of the door, or a reinforcing bar extending horizontally across the door. In such a case the sensor may be mounted on the door cill or on the door frame. In either event, on movement of the door, part of the door comes into contact with the sensor to apply a compressive force to the sensor, and the sensor will then respond. However, in alternative embodiments of the invention, the sensor is located at a position remote from the door. A movable element is provided which is separate from the door and separate from the sensor. One end of the movable element is initially located adjacent the door and the other end is initially located adjacent the sensor. On movement of the door, the movable element moves thus applying the compressive force to the sensor.

Thus, in one embodiment of the invention the movable element forms part of the door and is movable with the door.

Preferably the sensor is responsive to a compressive force in excess of a predetermined threshold.

In one embodiment the sensor is mounted on the floor of the motor vehicle adjacent to a lower part of the door. In such an embodiment said movable element comprises the lower part of the door. Alternatively, the sensor is mounted on the B-post. In such an embodiment the movable element comprises a substantially horizontally extending reinforcing bar that forms part of the door and which is movable with the door, one end of the reinforcing bar being located adjacent the sensor.

Preferably the sensor activates a safety device, which may be an air-bag which may be located on the monocoque shell of the vehicle or which may be mounted in a seat provided in the vehicle. The sensor may be an electrical sensor such as a switch or a pyrotechnic sensor such as a percussion cap. The sensor may respond to a predetermined compressional force, such as a force in excess of 1 to 2 kN. Alternatively, the sensor may be responsive to a predetermined speed of the movable element with respect to the fixed part of the sensor, such as a speed in excess of 1 to 2 meters per second. Alternatively, again the sensor may be responsive to a predetermined acceleration of the movable element with respect to the fixed part of the sensor.

In a preferred embodiment the sensor is responsive both to a compression having a force in excess of a predetermined threshold and a speed in excess of a predetermined threshold.

Preferably, the minimum compressive force to which the sensor responds is less than the force necessary to deform the part of the monocoque shell to which the sensor is fixed.

Conveniently, the movable element comprises an element having two opposed ends and mounted within the vehicle for movement relative to the monocoque shell, one end of the element being positioned to be engaged by part of the door on inward movement of that part of the door, the other end of the element being positioned to engage the sensor.

The invention also relates to a vehicle impact sensor arrangement for sensing a side impact on a motor vehicle, said motor vehicle having a monocoque shell comprising at least a floor, and a door mounted on the monocoque shell, the sensor arrangement comprising at least one sensor which is fixed to part of the floor of a monocoque shell, the sensor arrangement further comprising a movable element which is separate from the monocoque shell, said movable element being arranged and located to move relative to the monocoque shell to apply a force to the sensor, the sensor being adapted to respond to a force applied thereto in response to an inward movement of part of the door with respect to the monocoque shell.

The said point of the floor is preferably beneath the seat in the vehicle. Such a point in the floor of the vehicle is not subject to movement during the initial stages of a side impact, regardless of the severity of the side impact.

Preferably the sensor comprises a first part fixed to the said part of the monocoque shell, and a second part which is movable relative to the first part, a spring biassing the second part to a predetermined position relative to the first part, the second part being movable from the predetermined position against the bias of the spring in response to inward movement of the said part of the door, the second part carrying an accelerometer adapted to respond to an acceleration of the second part in excess of a predetermined threshold.

The invention also relates to a vehicle impact sensor arrangement, on a motor vehicle having a monocoque shell, for sensing a side impact, the sensor arrangement comprising at least one sensor which is directly or indirectly fixed to a B-post of the motor vehicle which forms part of the monocoque shell, the sensor being responsive to a compressive force exerted on the sensor, the vehicle further comprising at least one door, the door being provided with a substantially horizontally extending reinforcing bar, one end of the reinforcing bar being located adjacent the sensor, the one end of the reinforcing bar being located to exert a compressive force on the sensor in response to inward movement of the door with respect to the B-post.

DETAILED DESCRIPTION OF THE PREFERRED EMBODIMENTS

Figure 1:
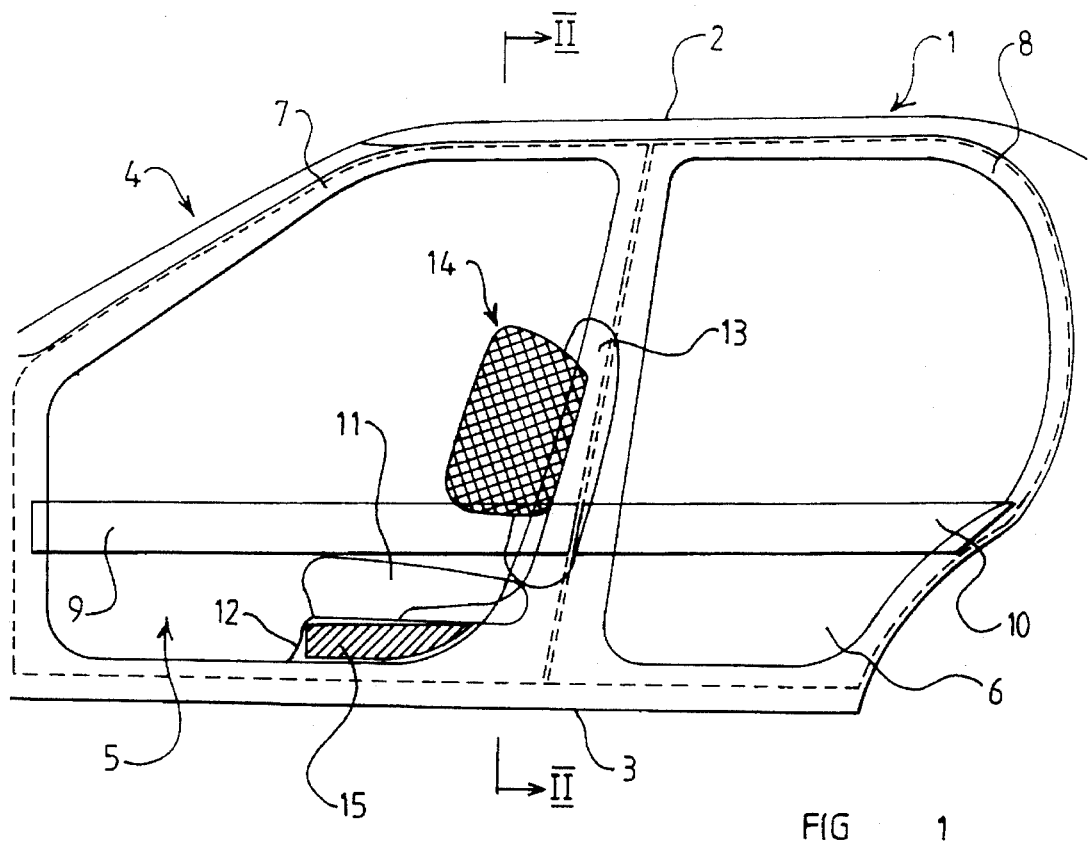
FIG. 1 is a diagrammatic side view of part of the monocoque shell of a motor vehicle provided with a vehicle impact sensor arrangement in accordance with the invention, with parts of the doors of the vehicle being shown in phantom.
Figure 2:
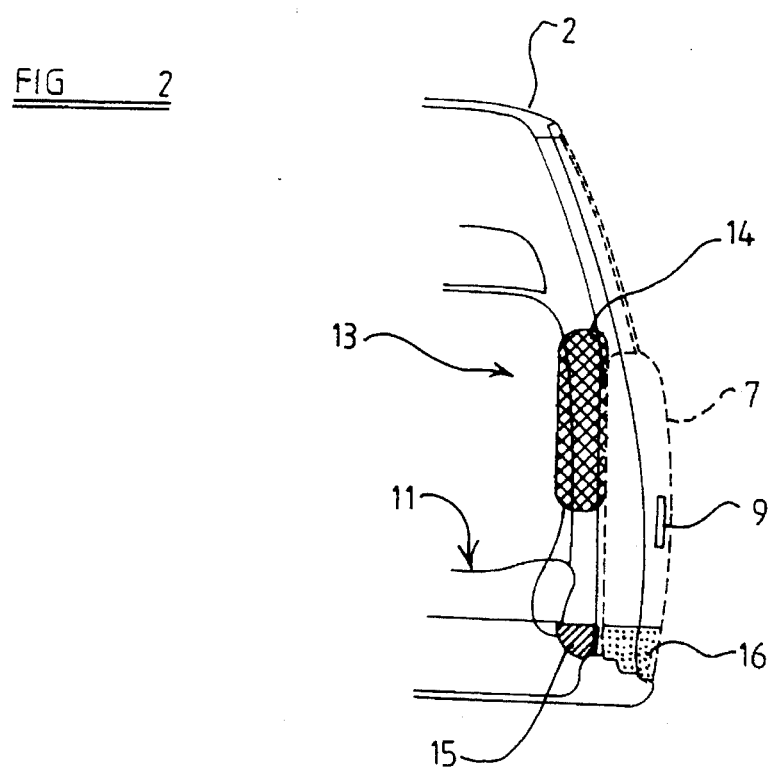
FIG. 2 is a sectional view taken on the line II—II of FIG. 1.

Referring initially to FIGS. 1 and 2 of the accompanying drawings, the central part of the monocoque shell 1 of a motor vehicle is illustrated. The part of the shell that is illustrated defines a roof 2, a floor 3, a front windscreen area 4 and side openings 5,6, which receive doors 7,8 respectively. Each door is provided with a horizontally extending reinforcing bar 9,10. The reinforcing bar 9,10 comprises a movable element that forms part of the door. The movable element moves relative to the monocoque shell as the door moves. Mounted within the monocoque shell 1 it a seat 11 which is mounted on a raised or profiled part 12 of the floor 3. Mounted within the back 13 of the seat is an air-bag 14 which is illustrated in the inflated condition. The air-bag is located in the part of the back 13 of the seat which is adjacent the door 7 so that, when inflated, the air-bag forms a cushion between a person sitting on the seat and the door 7.

Mounted at the side edge of the profiled parts 12 of the floor 3 adjacent the door 7 is a sensor 15 which acts as a trigger to inflate the air-bag 14. The sensor 15, as can be seen more clearly from FIG. 2, is located adjacent the lower part of the door 7 and, as can be seen from FIG. 2, the lower part of the door 7 is provided with reinforcing 16 so that the lower part of the door 7 is substantially rigid. The reinforcing 16 extends over the whole extent of the lower part of the door. The reinforcing may be a solid element that forms the lower part of the door, or a filling that is introduced to a hollow interior of the door and then sets. The lower part of the door need not be reinforced if the door is sufficiently stiff.

The sensor may be an electrical sensor, comprising, for example, a switch or may be a pyrotechnic sensor comprising, for example, a percussion cap.

It is to be appreciated that if the vehicle illustrated in FIGS. 1 and 2 is involved in a side impact, the sensor 15, which is mounted on the monocoque shell of the motor vehicle, is activated by inward movement of the reinforced part 16 of the door 7. Thus, the reinforced part 16 of the door can be considered to be a movable element that moves relative to the monocoque shell in response to inward movement of part of the door, since this part of the door will, of course, move inwardly, towards the sensor 15, if the vehicle is subjected to a side impact. The inward movement is mechanically transmitted from the point of impact (which may, for example, be in the region of the horizontal reinforcing bar 9) to the lower part of the door by the various mechanical elements that form the door.

In a typical side impact the door is struck at a position at least 50 mm about the level of the upper part of the door cill. The door is designed to apply a compression to the sensor if the door is struck in this region.

Figure 3:
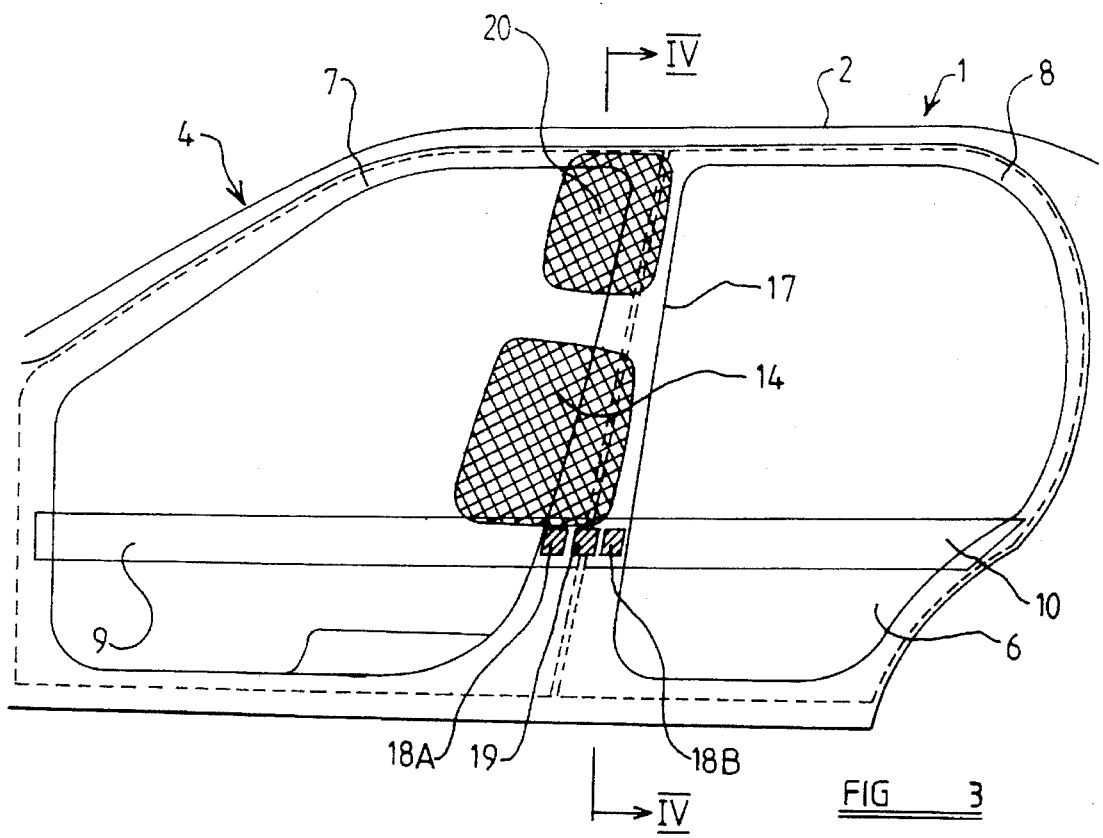
FIG. 3 is a view corresponding to FIG. 1 but illustrating an alternative embodiment of the invention.
Figure 4:
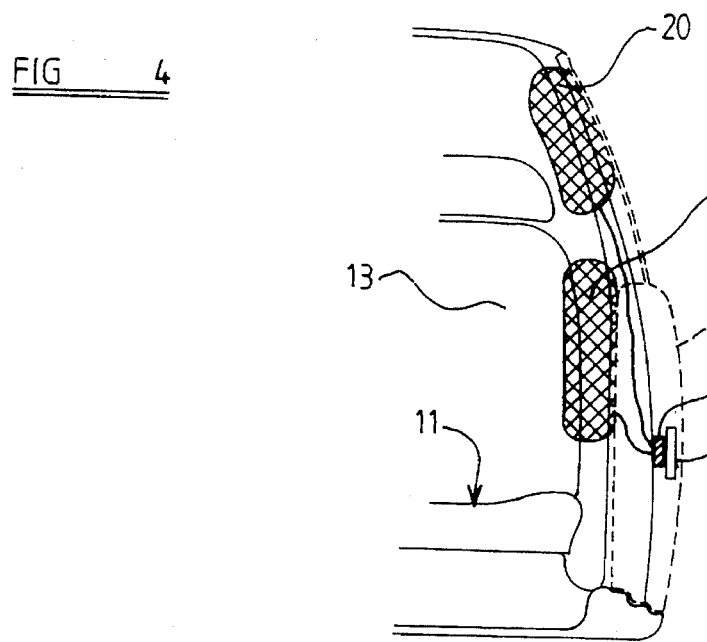
FIG. 4 is a sectional view taken on the lines IV—IV of FIG. 3.

Turning now to FIGS. 3 and 4, a modified embodiment of the invention is illustrated. In FIGS. 3 and 4 the same reference numerals have been used, as in FIG. 1 to identify the various parts of the arrangement shown in FIGS. 3 and 4 which are the same as in FIGS. 1 and 2. These parts will not be re-described.

It is to be observed, with reference to FIGS. 3 and 4, that the reinforcing bars 9 and 10 which are mounted in the doors 7 and 8 extend to lie adjacent the "B-post" 17 which forms part of the monocoque shell 1 and which is located between the doors 7 and 8. FIG. 3 illustrates three sensors 18A,18B, 19 mounted on the B-post in alignment with the reinforcing bars 9 and 10. It is envisaged that in a practical embodiment of the invention either the sensors 18A and 18B would be provided or, alternatively, the sensor 19 would be provided. Each of sensors 18A and 18B are aligned with part of a respective reinforcing bar 9 or 10, whereas the sensor 19 is aligned with the end regions of both of the reinforcing bars 9 and 10.

As can be seen, the sensor 19 is connected not only to the air-bag 14 which is mounted in the side of the back of the seat 13, but also to a further air-bag 20 which is mounted in the roof of the vehicle and, when inflated, is adapted to be located between the head of a person sitting on the seat 11 and the door 7 of the motor vehicle.

It is to be appreciated that if the vehicle illustrated in FIGS. 3 and 4 is subjected to a side impact, if either the door 7 or the door 8 is impacted and thus moves inwardly, the part of the reinforcing bar 9 or 10 will move inwardly and will contact either the sensors 18 and 20 or the sensor 19. The sensor will respond and will effect inflation of the air-bags 14 and 20.

Figure 5:
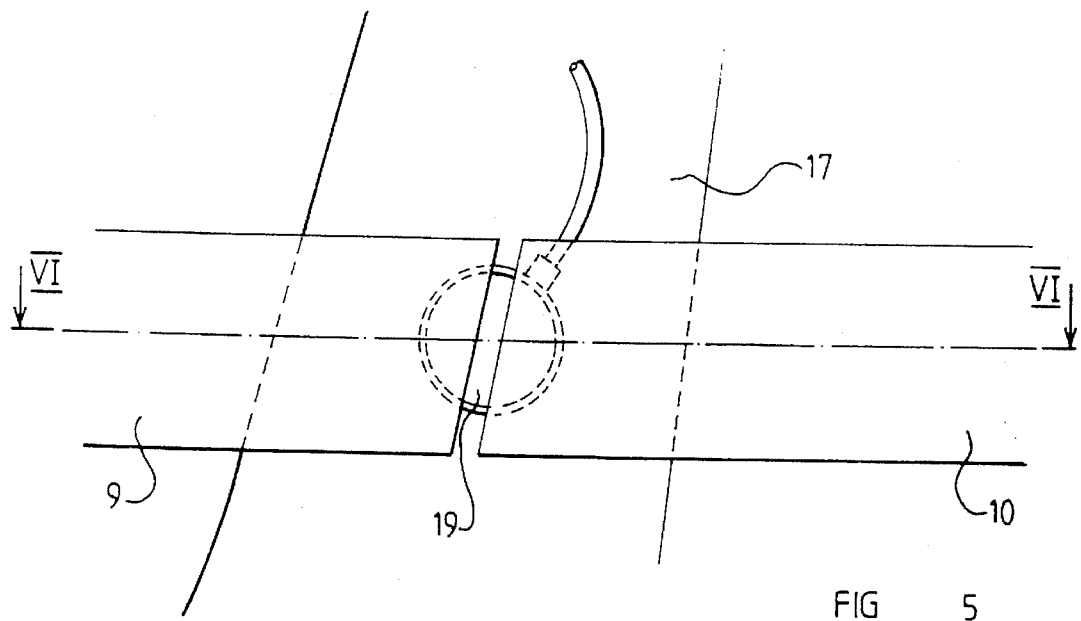
FIG. 5 is an enlarged view illustrating a B-post of a motor vehicle with a sensor in accordance with the invention as illustrated in FIGS. 3 and 4, also illustrating the position of reinforcing bars present in the doors of the vehicle.
Figure 6:
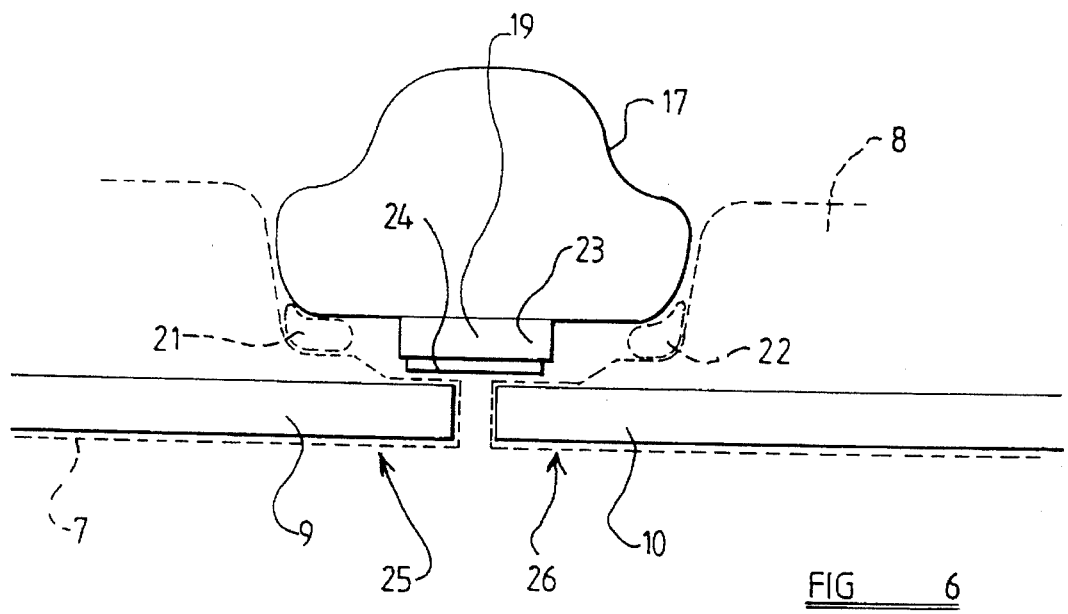
FIG. 6 is a view taken on the line VI—VI of FIG. 5.

FIG. 5 illustrates the sensor 19 mounted on the B-post 17, and shows how the reinforcing bars 9 and 10 extend adjacent the sensor 19. This structure is also illustrated in FIG. 6. Referring to FIG. 6, the form of the doors 7 and 8 can be observed and the rubber seals 21,22 provided on the doors can be identified located between the inner parts of the doors and the outer parts of the "B-post" 17. The sensor 19 can be seen to comprise a housing 23 provided with a plunger 24 adapted to move inwardly into the housing 23. It can also be observed that the horizontal reinforcing bars 9,10 extend into protruding portions 25,26 of the doors 7 and 8, these protruding portions lying immediately in front of the B-post 17 and thus being aligned with the sensor 19.

Figure 7:
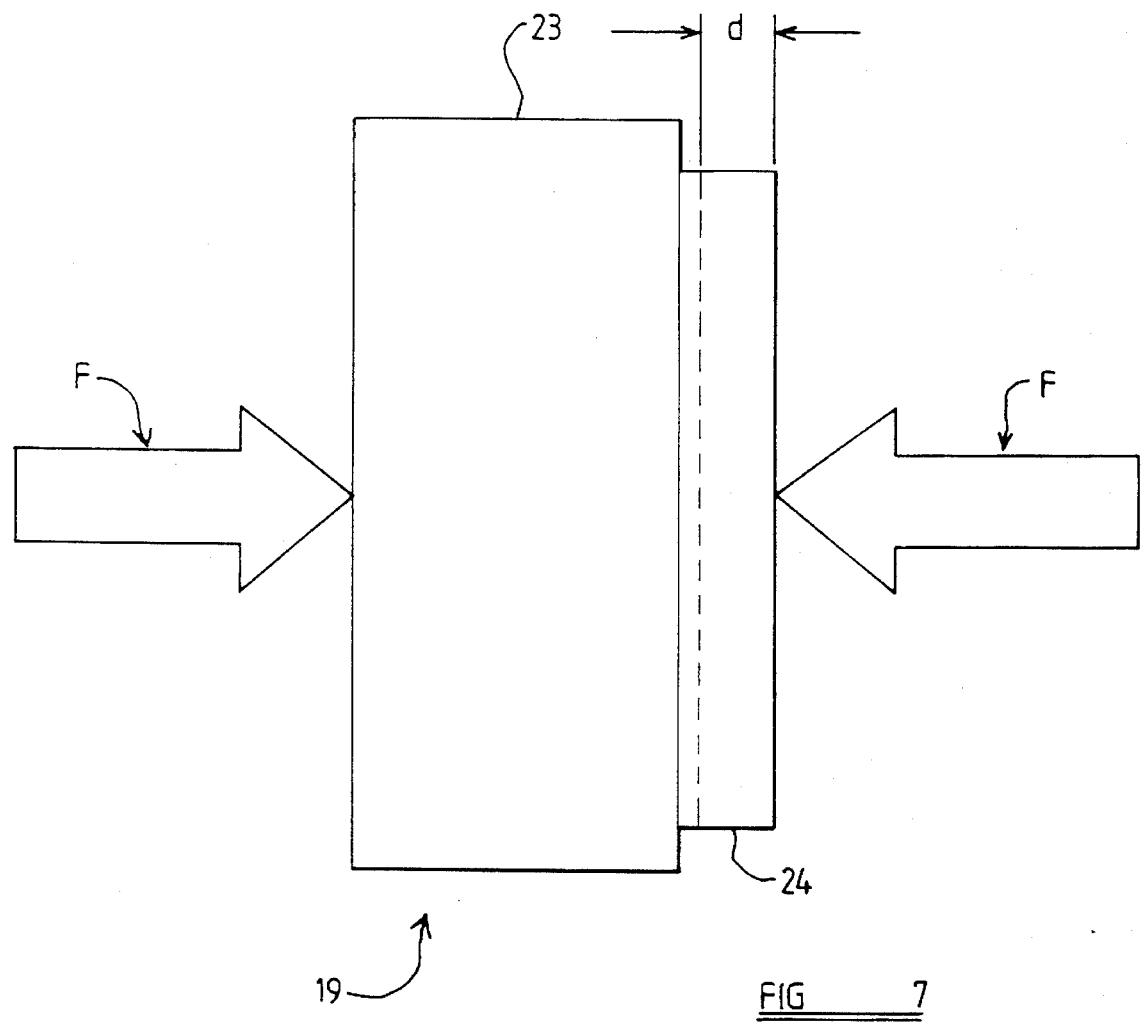
FIG. 7 is a diagrammatic view of the sensor shown in FIG. 6.

FIG. 7 is an enlarged view of the sensor 19, showing the housing 23 and the plunger 24. The plunger 24 can move inwardly by a distance "d", as illustrated, when subjected to a force "F", as indicated by the arrow. Since action and re-action are equal and opposite a corresponding force "F" will be applied to the housing 23 by the B-post 17.

The sensor may be an electrical sensor, comprising a switch or may be a pyrotechnic sensor, comprising a percussion cap, and is preferably responsive to a compressive force in excess of a predetermined threshold. The force may be related to the degree of deformation of the door. In other words, the sensor is responsive to a predetermined movement of the plunger 24, in which case means may be provided within the housing 23 to resist movement of the plunger 24, the plunger only moving if the force applied to the plunger exceeds a predetermined threshold. Alternatively, the sensor 23 may be responsive to the speed of movement of the plunger 24 or to the acceleration of the plunger 24. Preferably the sensor is responsive to a compression having a force in excess of a predetermined threshold and also a speed in excess of a predetermined threshold, the force preferably being between 1 and 2 kN, and the speed having a value of between 1 and 2 meters per second.

The minimum compressive force that must be applied to the sensor to cause the sensor to respond to activate the safety device, such as the air-bag, is less than the force necessary to deform the part of the monocoque shell to which the sensor is fixed. The movable element thus moves in response to a side impact to apply the compressive force to the sensor. The sensor is compressed and responds very rapidly, deploying the safety device in a very short period of time.

In the embodiments described above, a movable element forms an integral part of the door or which is securely connected to the door comprises the element that applies the force to the sensor.

Figure 8:
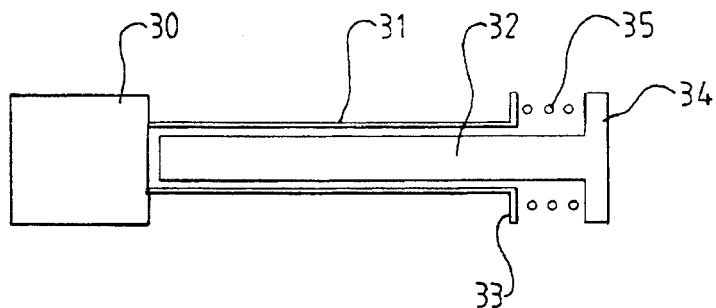
FIG. 8 is a diagrammatic side view of part of a further embodiment of the invention.
Figure 9:
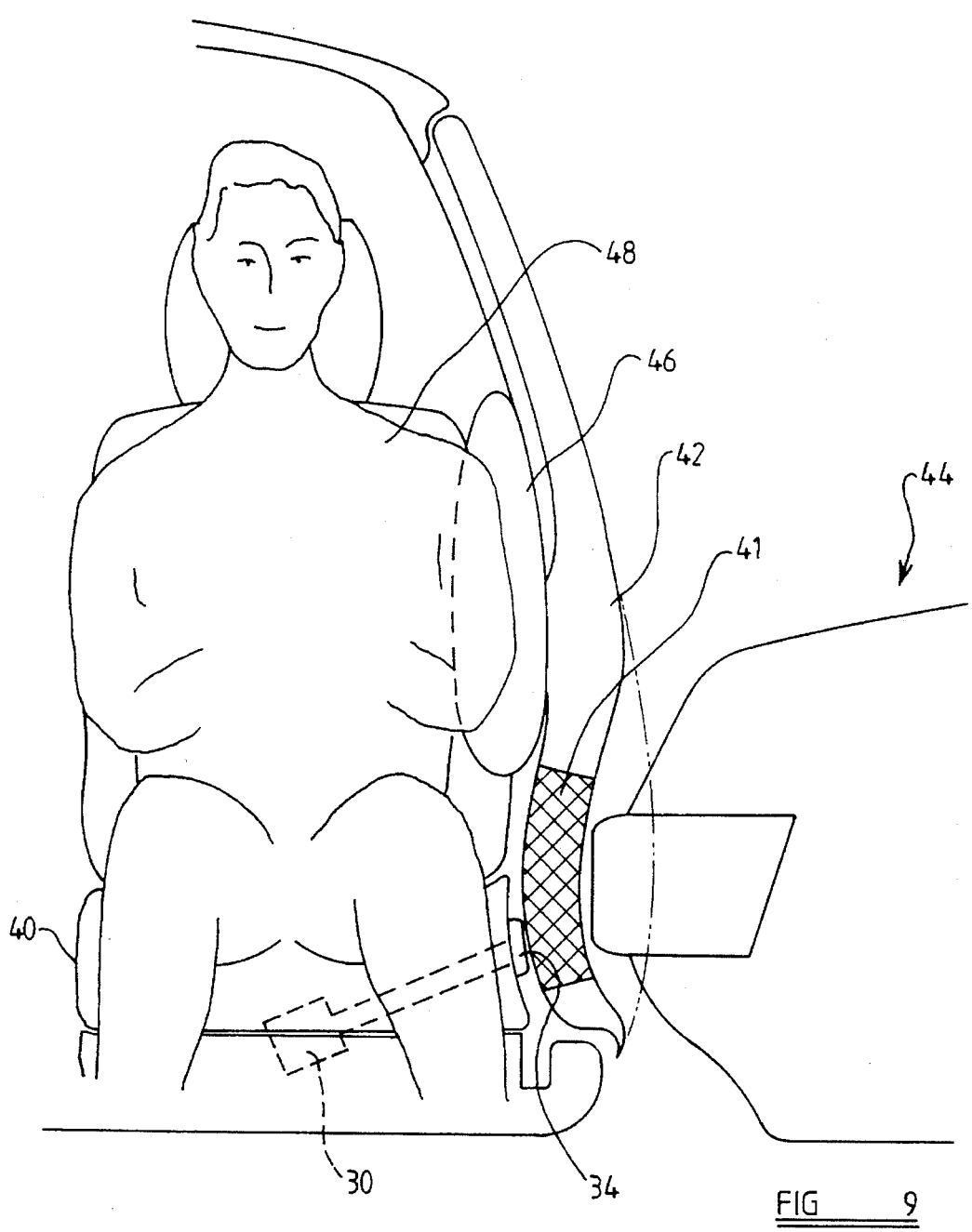
FIG. 9 is a diagrammatic view illustrating the further embodiment of the invention partially illustrated in FIG. 8 during an accident situation.

FIGS. 8 and 9 illustrate an alternative embodiment of the invention. Referring initially to FIG. 8, a sensor 30 is provided associated with a guide tube 31. Telescopically received within the guide tube 31 is a movable element 32. The end of the guide tube 31 remote from the sensor 30 is provided with an outwardly directed flange 33, and the end of the movable element 32 adjacent the flange 33 is provided with an enlarged head 34. A spring 35 is provided located between the flange 33 and the enlarged head 34. The spring 35 serves to maintain the movable element 32 in the position illustrated, with the enlarged head 34 spaced away from the flange 33.

Referring now to FIG. 9, it can be seen that the housing 30 containing the sensor is connected to part of the floor of a vehicle, forming part of the monocoque shell of a vehicle, at a position beneath the seat 40. Initially, the enlarged head 34 is located adjacent a reinforced part 41 of a side door 42 of the motor vehicle.

In FIG. 9 the vehicle is illustrated during a side impact. A second vehicle 44 has impacted the door 42 of the vehicle containing the safety device. The reinforced part 41 has been brought into engagement with the enlarged head 34 of the movable element 32. The movable element 32 is thus moved against the bias of the spring 35, bringing the end of the movable element 32 adjacent the sensor housing 30 into contact with the sensor housing 30. Thus, a compressive force has been applied to the sensor housing 30, by the end of the movable element 32, since the sensor housing 30 is securely connected to the monocoque shell of the motor vehicle. The force applied to the sensor housing has been in excess of a predetermined threshold which causes deployment of a safety device in the form of an air-bag 46. The air-bag 46 inflates swiftly to a position between the occupant 48 of the vehicle, and the point at which the side impact is occurring.

It is thought that some benefits arise from having the sensor fixed to the monocoque shell at a position away from the door frame, that is to say at a position remote from the door cill and also from the B-post. During an accident there is less chance of the floor, at a position remote from the door, being deformed during the first moments after the side impact commences. This means that the sensor will effectively be fixed securely in position, and any movement of the door will cause a substantial compressional force to be applied to the sensor, thus activating the sensor in the shortest practicable period of time.

Figure 10:
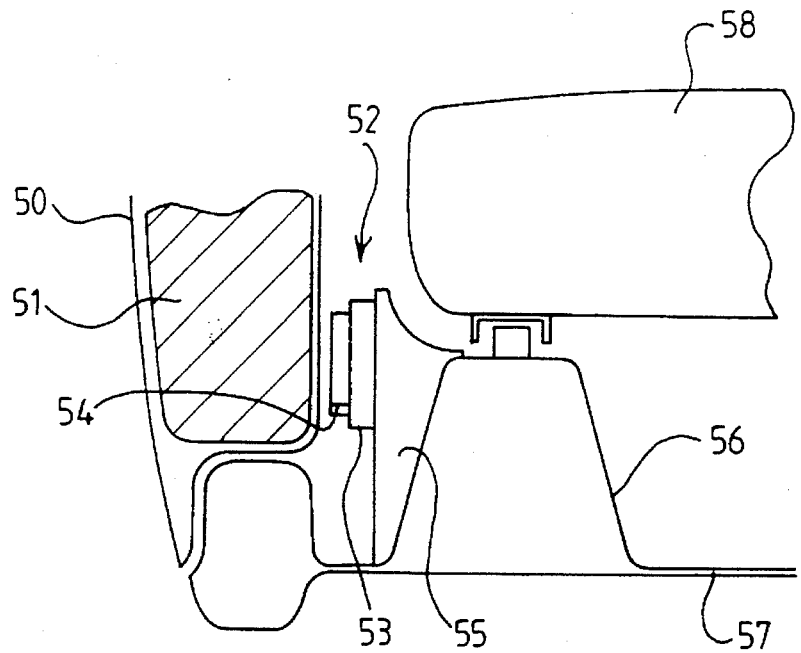
FIG. 10 is a diagrammatic view illustrating a further embodiment of the invention.

Referring now to FIG. 10, a further example of the invention is illustrated in which a door 50 for a motor vehicle has the lower part 51 thereof reinforced. A sensor 52 is provided comprising a housing 53 having a movable plunger 54 protruding therefrom. The plunger is located adjacent the lower part of the door for being contacted by the lower part of the door in the event that the door is deformed or moved as a consequence of a side impact. The housing 53 is connected to a mounting element 55, which secures the housing to a ridge 56 formed in the floor 57 of the vehicle at a position beneath the seat 58.

Since the sensor 52 is connected indirectly to the ridge 56 formed in the floor 57 of the monocoque shell, there is a minimum risk of the sensor housing 53 moving from the illustrated position during the first instance of a side impact.

Figure 11:
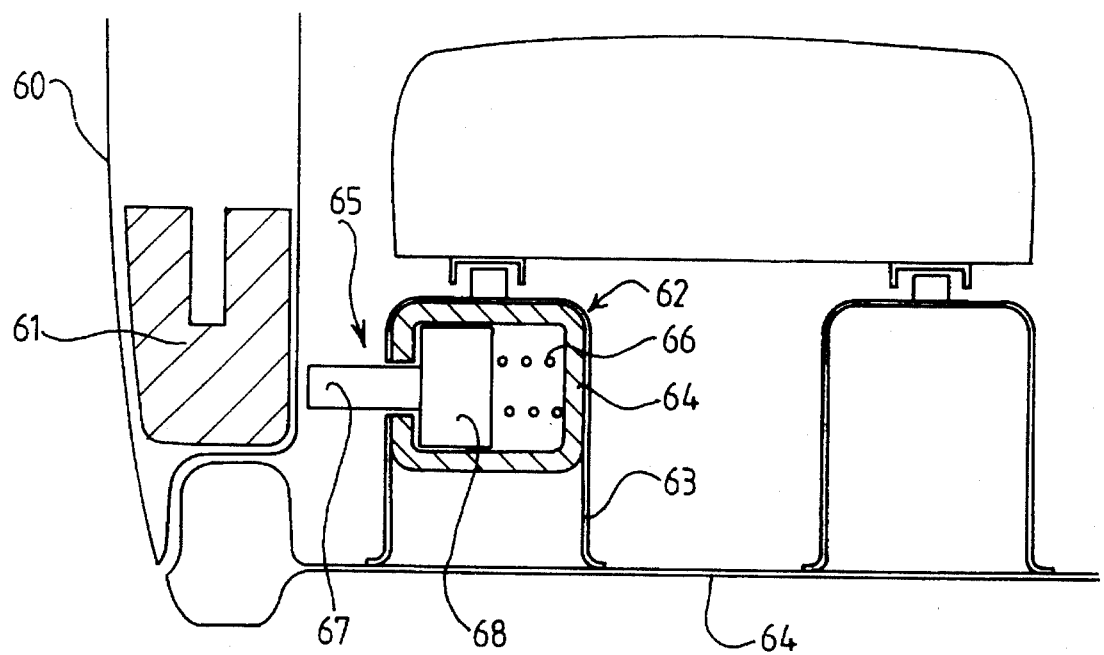
FIG. 11 is a diagrammatic view illustrating yet a further embodiment of the invention.

FIG. 11 illustrates a further modified embodiment of the invention.

In this embodiment of the invention a side door 60 of a motor vehicle has the lower part 61 thereof reinforced.

A sensor 62 is provided which is mounted within a ridge 63 forming part of the floor 64 of the motor vehicle. The sensor 62 comprises an outer housing 64 and a movable part 65 which is movable relative to the housing 64. The movable part 65 is biassed to an initial position, as illustrated, by means of a helical spring 66 which is contained within the housing 64 and which engages one end of the housing 64 and the part 65. The part 65 comprises a drive rod 67, having a free end located immediately adjacent the reinforced part 61 of the door 60, and a chamber 68, carried by the drive rod 67, which contains an accelerometer. The chamber 68 is located within the housing 64 and is engaged by the spring 66. If the sensor is subjected to a compressional force, as a result of inward movement of the door 60, with the compressional force being applied to the free end of the drive rod 67, the accelerometer will provide an output signal as the part 65 moves against the spring bias provided by the spring 66. If the signal from the accelerometer exceeds a predetermined threshold, an air-bag is inflated in the manner described above.

Whilst the invention has been described with reference to embodiments in which the sensor activates an air-bag mounted in the seat of the motor vehicle and an air-bag mounted in the roof of the motor vehicle, the sensor may trigger other safety devices such as an air-bag mounted in the B-post or even a pre-tensioner. It is envisaged that if the doors of the vehicle are sufficiently stiff, the reinforcing elements may be omitted. The sensor may be indirectly mounted on the monocoque shell of the vehicle by an intermediate supporting plate or the like. However, the sensor is mounted so that it is substantially fixed in position relative to the monocoque shell.

What is claimed is:

1. A vehicle impact sensor arrangement for sensing a side impact on a motor vehicle, said motor vehicle having a monocoque shell comprising at least a floor, a door cill and a B-post, and a door mounted on the monocoque shell, the sensor arrangement comprising at least one sensor which is directly or indirectly fixed to the B-post of the monocoque shell and which is responsive to a compressional force exerted on the sensor, the sensor arrangement further comprising a movable element constituted by a reinforcing element present in the door and which is separate from the monocoque shell, said movable element being initially located adjacent the sensor and being arranged and located to move relative to the monocoque shell to contact the sensor and exert a compressive force on the sensor, compressing the sensor between said movable element and said part of the monocoque shell to which the sensor is fixed, in response to an inward movement of a part of the door with respect to said part of the monocoque shell.

2. An arrangement according to claim 1 wherein the sensor is responsive to a compressive force in excess of a predetermined threshold.

3. An arrangement according to claim 1 wherein the movable element comprises a substantially horizontally extending reinforcing bar that forms part of the door and which is movable with the door, one end of the reinforcing bar being located adjacent the sensor.

4. An arrangement according to claim 1 wherein the sensor activates a safety device.

5. An arrangement according to claim 4 wherein the sensor activates an air-bag.

6. An arrangement according to claim 5 wherein the air-bag is located on the monocoque shell of the vehicle.

7. An arrangement according to claim 5 wherein the air-bag is mounted in a seat provided within the vehicle.

8. An arrangement according to claim 1 wherein the sensor is an electrical sensor.

9. An arrangement according to claim 8 wherein the sensor comprises a switch.

10. An arrangement according to claim 1 wherein the sensor is a pyrotechnic sensor.

11. An arrangement according to claim 10 wherein the sensor comprises a percussion cap.

12. An arrangement according to claim 1 wherein the sensor responds to a force in excess of 1 to 2 kN.

13. An arrangement according to claim 1 wherein the sensor is responsive to a predetermined speed of the movable element with respect to the sensor.

14. An arrangement according to claim 13 wherein the sensor responds to a speed of the movable element in excess of 1 to 2 meters per second.

15. An arrangement according to claim 1 wherein the sensor is responsive to a predetermined acceleration of the movable element with respect to the fixed part of the sensor.

16. An arrangement according to claim 1 wherein the sensor is responsive to a compression having a force in excess of a predetermined threshold and a speed in excess of a predetermined threshold.

17. An arrangement according to claim 1 wherein the minimum compressive force to which the sensor responds is less than the force necessary to deform the said part of the monocoque shell to which the sensor is fixed.

18. An arrangement according to claim 1 wherein the sensor comprises an operative part mounted at a distance from the door and another part extending from the operative part to a position adjacent the reinforcing element in the door.

19. A vehicle impact sensor arrangement for sensing a side impact on a motor vehicle, said motor vehicle having a monocoque shell comprising at least a floor, and a door mounted on the monocoque shell, the sensor arrangement comprising at least one sensor including a first part which is fixed to a part of the floor of the monocoque shell, a second part which is movable relative to the first part and includes an accelerometer, and a spring biassing the second part to a predetermined position relative to the first part, the sensor arrangement further comprising a movable element constituting a reinforcing element present in the door and which is separate from the monocoque shell, said movable element being arranged and located to move relative to the monocoque shell to apply a force to the second part of the sensor, the second part of the sensor being movable from the predetermined position against the bias of the spring in response to an inward movement of a part of the door with respect to the monocoque shell, the accelerometer in the second part of the sensor being adapted to respond to an acceleration of the second part in excess of a predetermined threshold.

20. A vehicle impact sensor arrangement on a motor vehicle having a monocoque shell, for sensing a side impact, the sensor arrangement comprising at least one sensor which is directly or indirectly fixed to a B-post of the motor vehicle which forms part of the monocoque shell, the sensor being responsive to a compressive force exerted on the sensor, the vehicle further comprising at least one door, the door being provided with a substantially horizontally extending reinforcing bar, one end of the reinforcing bar being located adjacent the sensor for exerting a compressive force on the sensor in response to inward movement of the door with respect to the B-post.

21. A vehicle impact sensor arrangement for sensing a side impact on a motor vehicle, said motor vehicle having a monocoque shell comprising at least a floor, a door cill and a B-post, and a door mounted on the monocoque shell, the sensor arrangement comprising at least one sensor which is responsive to a compressional force exerted on the sensor, the at least one sensor including a first part which is directly or indirectly fixed to a part of the monocoque shell of the motor vehicle, either adjacent a lower part of the door or on the B-post, a second part which is movable relative to the first part and includes an accelerometer, and a spring biassing the second part to a predetermined position relative to the first part, the sensor arrangement further comprising a movable element constituted by a reinforcing element present in the door and which is separate from the monocoque shell, said movable element being initially located adjacent the second part of the sensor and being arranged and located to move relative to the monocoque shell to contact the sensor and exert a compressive force on the second part of the sensor, the second part of the sensor being movable from the predetermined position against the bias of the spring in response to an inward movement of a part of the door with respect to the part of the monocoque shell, the accelerometer in the second part of the sensor being adapted to respond to an acceleration of the second part in excess of a predetermined threshold.

* * * * *